US012742340B2

(12) United States Patent
Gorkovenko et al.

(10) Patent No.: US 12,742,340 B2
(45) Date of Patent: Sep. 22, 2026

(54) TRIM PIECE FOR DOOR LATCHING ASSEMBLY

(71) Applicant: ASSA ABLOY Americas Residential Inc., New Haven, CT (US)

(72) Inventors: Elena Gorkovenko, Mission Viejo, CA (US); James Lin, Laguna Niguel, CA (US); Wei Hsu, Lake Forest, CA (US); Elliott Schneider, Foothill Ranch, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 109 days.

(21) Appl. No.: 18/448,625

(22) Filed: Aug. 11, 2023

(65) Prior Publication Data

US 2024/0052672 A1 Feb. 15, 2024

Related U.S. Application Data

(60) Provisional application No. 63/371,269, filed on Aug. 12, 2022.

(51) Int. Cl.
*E05B 15/02* (2006.01)

(52) U.S. Cl.
CPC .................................... *E05B 15/02* (2013.01)

(58) Field of Classification Search
CPC ........ E05B 15/02; E05B 15/1614; E05B 3/06; Y10T 292/82; Y10T 292/85; Y10T 292/91
See application file for complete search history.

(56) References Cited

U.S. PATENT DOCUMENTS

| | | | |
|---|---|---|---|
| 2,904,989 | A | 9/1959 | Ellison |
| 4,770,251 | A | 9/1988 | Sweet |
| 4,873,853 | A | 10/1989 | Foshee |
| 4,995,249 | A | 2/1991 | Preissler et al. |
| 5,161,567 | A | 11/1992 | Humpert |
| 5,566,996 | A | 10/1996 | Massey et al. |
| 6,202,352 | B1 | 3/2001 | Wilkes |
| 6,389,756 | B1 | 5/2002 | Oberdorfer |
| 6,523,375 | B2 | 2/2003 | Beatty |

(Continued)

FOREIGN PATENT DOCUMENTS

| | | |
|---|---|---|
| CA | 2885447 | 9/2015 |
| CN | 2522546 | 11/2002 |

(Continued)

OTHER PUBLICATIONS

Translation of DE-102016108629 (Year: 2017).*

*Primary Examiner* — Christine M Mills
*Assistant Examiner* — Yahya Sidky
(74) *Attorney, Agent, or Firm* — Merchant & Gould P.C.

(57) ABSTRACT

A trim surround is installable around a trim plate of a door latching assembly. The trim surround may have a shape complementary to and installable around an outer perimeter of a trim plate. The trim surround can have a front edge and a rear edge, and a retaining mechanism. The trim surround may be ring shaped to be complementary to a round trim plate of the door latching assembly. In some cases, the retaining mechanism can include a flange that extends inwardly of the trim plate such that the flange retains the trim surround in place around the trim plate when the door latching assembly is mounted to a door.

19 Claims, 10 Drawing Sheets

(56) References Cited

U.S. PATENT DOCUMENTS

| | | | | |
|---|---|---|---|---|
| 6,568,231 | B1 | 5/2003 | Huang | |
| 6,745,602 | B2 | 6/2004 | Nakasone et al. | |
| 8,235,431 | B2 * | 8/2012 | Williamson | E05B 15/02 292/357 |
| 10,012,008 | B2 | 7/2018 | Karnutsch et al. | |
| 2006/0244272 | A1 | 11/2006 | Roth et al. | |
| 2011/0225770 | A1 | 9/2011 | Alber | |
| 2017/0183892 | A1 * | 6/2017 | Kaukinen | E05B 13/004 |
| 2017/0227144 | A1 * | 8/2017 | Heaton | F16L 41/088 |
| 2021/0270058 | A1 | 9/2021 | Boomer et al. | |
| 2021/0274669 | A1 | 9/2021 | Baumgartner et al. | |

FOREIGN PATENT DOCUMENTS

| | | | | |
|---|---|---|---|---|
| CN | 103306538 | | 9/2013 | |
| CN | 205634510 | | 10/2016 | |
| CN | 211851285 | | 11/2020 | |
| DE | 102016108629 | A1 * | 11/2017 | E05B 15/02 |
| EP | 2314805 | | 4/2011 | |
| WO | WO-2015174828 | A1 * | 11/2015 | E05B 3/06 |

* cited by examiner

TRIM PIECE FOR DOOR LATCHING ASSEMBLY

CROSS-REFERENCE TO RELATED APPLICATIONS

The present application claims priority from U.S. Provisional Patent Application No. 63/371,269, filed on Aug. 12, 2022, the disclosure of which is hereby incorporated by reference in its entirety.

BACKGROUND

Door hardware, such as handlesets, locksets, and the like, are typically mounted at a borehole extending through a door, adjoined with a crossbore within which a latch is positioned. On opposite sides of the door, an interior assembly and an exterior assembly may be mounted. Each assembly may include, for example, a mechanical lock core actuatable via a key, a manual turn piece, or a handleset.

Typically, a plate extends across the borehole on either side of the door, and fasteners, such as bolts or other hardware, extend through the borehole. Additionally, a torque blade extends through the borehole, attached to the handles, turnpiece, and/or lock core to interact with the latch. In some instances, the plate may be formed to have a decorative exterior. In other instances, a decorative exterior plate may cover a base plate on either side of the borehole. This decorative exterior plate, or decorative plate (where no base plate is utilized), is referred to herein as a decorative plate or trim plate.

A wide variety of decorative exterior appearances may be utilized for the decorative plate. Typically, the decorative plate is integrated into a handleset or lockset at the time of manufacturing, either as part of the assembly for connection through the borehole, or by attaching a decorative exterior plate to the base plate. Accordingly, to change and aesthetic appearance of the door hardware, the entirety of the handlesets or locksets will be replaced. This includes the lock core, as well as the decorative base plate(s) on both the interior and exterior sides of the door, the manual turnpiece on the interior side of the door, and the like. In the case of a handleset, typically the handleset and any decorative plates are all replaced at the same time.

In some instances, it may be desirable to make a comparatively minor change to the aesthetic appearance of a handleset or lockset. For example, an appearance of the decorative trim plates that surrounds a lock core or a spindle may be desired to be modified, without changing the appearance of the handle, or without changing the lock core (thereby avoiding having to rekey a different lock core). To achieve such aesthetic changes, some handlesets and locksets allow for removal of the entire handleset or lockset assembly from a door, and separation of the decorative plate from the base plate. The handleset or lockset may then be reinstalled on the door at the borehole with a new decorative plate. However, such removal and reinstallation, as well as changing of the decorative plate, is not without difficulty. This is because often the decorative plate is mounted to the base plate in a particular manner that may not be readily interchangeable with other types of decorative plates (e.g., due to mismatched placements of fasteners holding the decorative plate to the main plate, and the like). Furthermore, it is often the case that an initial installation of handlesets or locksets may utilize a relatively unadorned decorative plates. Still further, in circumstances where there is no separable decorative exterior plate and base plate, there is limited ability to change the exterior appearance of the door hardware.

SUMMARY

In general, a trim surround is installable around a trim plate of a door latching assembly. The trim surround may have a shape complementary to and installable around an outer perimeter of a trim plate. The trim surround can have a front edge and a rear edge, and a flange extending radially inwardly from the rear edge. The trim surround may be ring shaped to be complementary to a round trim plate of the door latching assembly. The flange may extend inwardly of the trim plate such that the flange retains the trim surround in place around the trim plate when the door latching assembly is mounted to a door.

In a first aspect, a door latching assembly is provided. The door latching assembly includes an actuating mechanism including at least one of a mechanical lock assembly or a handle. The actuating mechanism includes a retention portion and an axial portion, the axial portion extending into a borehole of a door when installed at the door, and including a rotatable portion. The door latching assembly further includes a trim plate surrounding an aperture sized to allow the axial portion of the actuating mechanism to extend therethrough, the trim plate being sized to cover the borehole of the door on which the door latching assembly is installed, the trim plate having an exposed front face and an inner flange positioned to interface with the retention portion of the actuating mechanism. The door latching assembly further includes a trim ring having a shape complementary to and installable around an outer perimeter of the trim plate, the trim ring having a front edge and a rear edge, the trim ring including a flange extending radially inwardly from the rear edge to a position inward toward the rotatable portion of the actuating mechanism on a side of the trim plate opposite the exposed front face.

In a second aspect, a door latching assembly includes an actuator including a retention portion and an axial portion that is rotatable relative to the retention portion. The door latching assembly also includes a trim plate surrounding an aperture sized to allow the axial portion of the actuator to extend therethrough, the trim plate having an exposed front face. The trim plate is positioned to interface with the retention portion of the actuator. The door latching assembly also includes a base plate including a threaded cylindrical protrusion extending through the trim plate. The door latching assembly includes a trim surround having a shape complementary to and installable around an outer perimeter of the trim plate, the trim surround having a front edge and a rear edge. The trim surround includes a flange extending radially inwardly from the rear edge to a position inward from an outermost edge of the trim plate on a side of the trim plate opposite the exposed front face.

In a third aspect, a trim ring is disclosed that is installable around a circular trim plate of a door latching assembly, the trim ring having a predetermined outer diameter and a front face. The trim ring includes a cylindrical body having a front edge, a rear edge, and a radially outward surface having a decorative pattern formed thereon, as well as a flange extending inwardly from the rear edge on a side opposite the front face of the circular trim plate.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
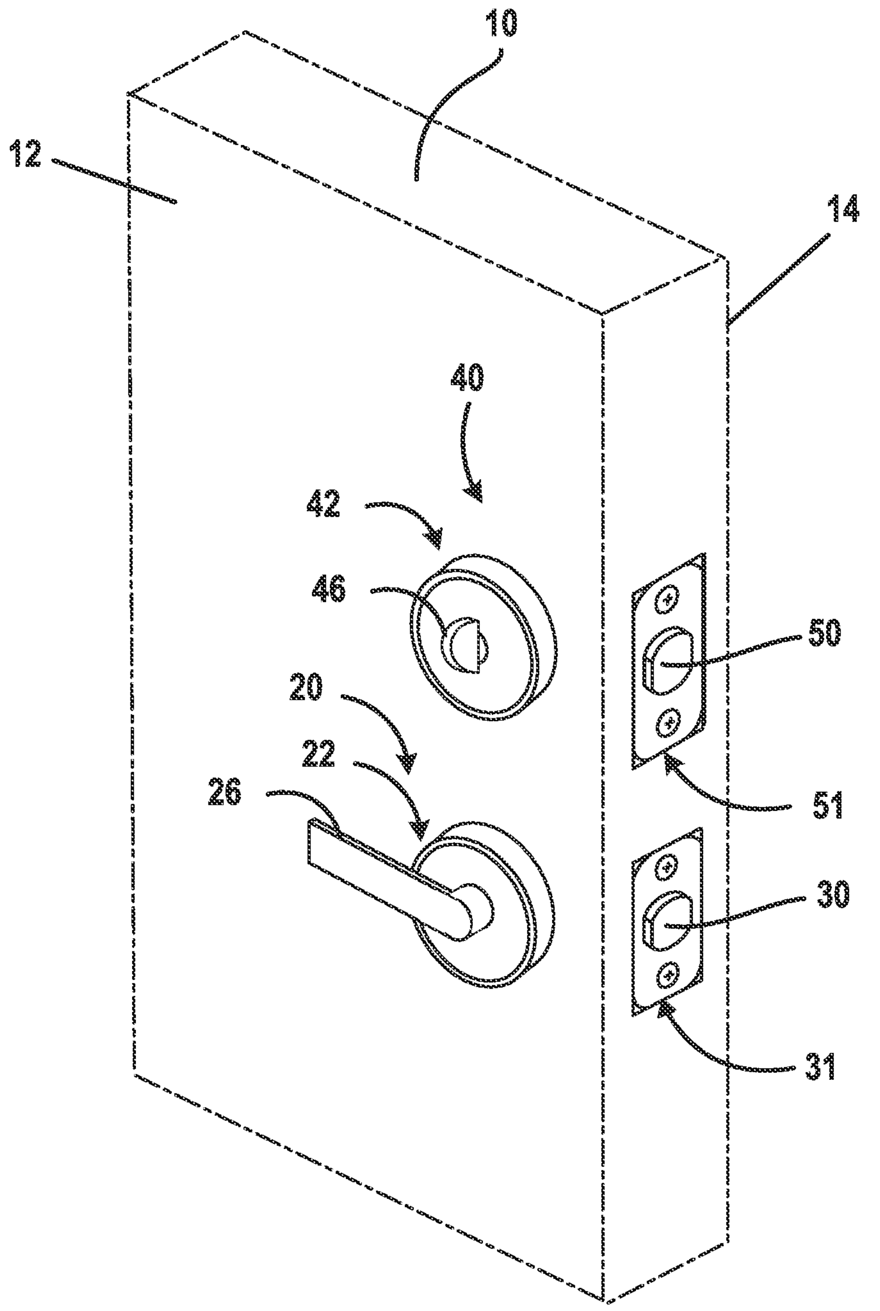
FIG. 1 illustrates a perspective view of an interior portion of a door having a lockset assembly and a handleset assembly installed thereon.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As briefly described above, embodiments of the present invention are directed to a trim piece useable in conjunction with door latching assemblies, such as handlesets and locksets, as well as such door latching assemblies or other actuating assemblies that incorporate such a trim piece. The trim piece is constructed to be retained around a trim plate of a handleset or lockset by having an interior footprint that is complementary to the trim plate (e.g., by being circular or cylindrical, and of a same diameter as the outer diameter of the trim plate), and may include decorative indicia along at least an outer surface. The trim piece may be referred to as a "surround" and can be used to change an overall aesthetic appearance of the handleset or lockset, while maintaining a trim plate in a visible location that surrounds a latch actuator (e.g., a mechanical lock core, a turnpiece, handle, or the like).

In example aspects, the trim piece may take the form of a trim ring having an inner diameter that is complementary to an outer diameter of a trim plate of the handleset or lockset. The trim ring may also include a flange that may be retained between the trim plate and a door, such that the trim ring is maintained against the door. Once the trim ring is installed, all or at least a portion of an outward-facing surface of the trim plate of a handleset or lockset may remain visible. The trim ring forms a revised overall appearance of the handleset or lockset.

In further example aspects, the actuating assembly may be non-pivotable, and may simply represent a handle or pull knob that may be used on door hardware.

In accordance with various examples, the use of a complementary trim piece that may be easily installable in addition to an existing trim plate provides adjustability of the aesthetic appearance of such a handleset or lockset, while maintaining simplicity of construction.

Figure 2:
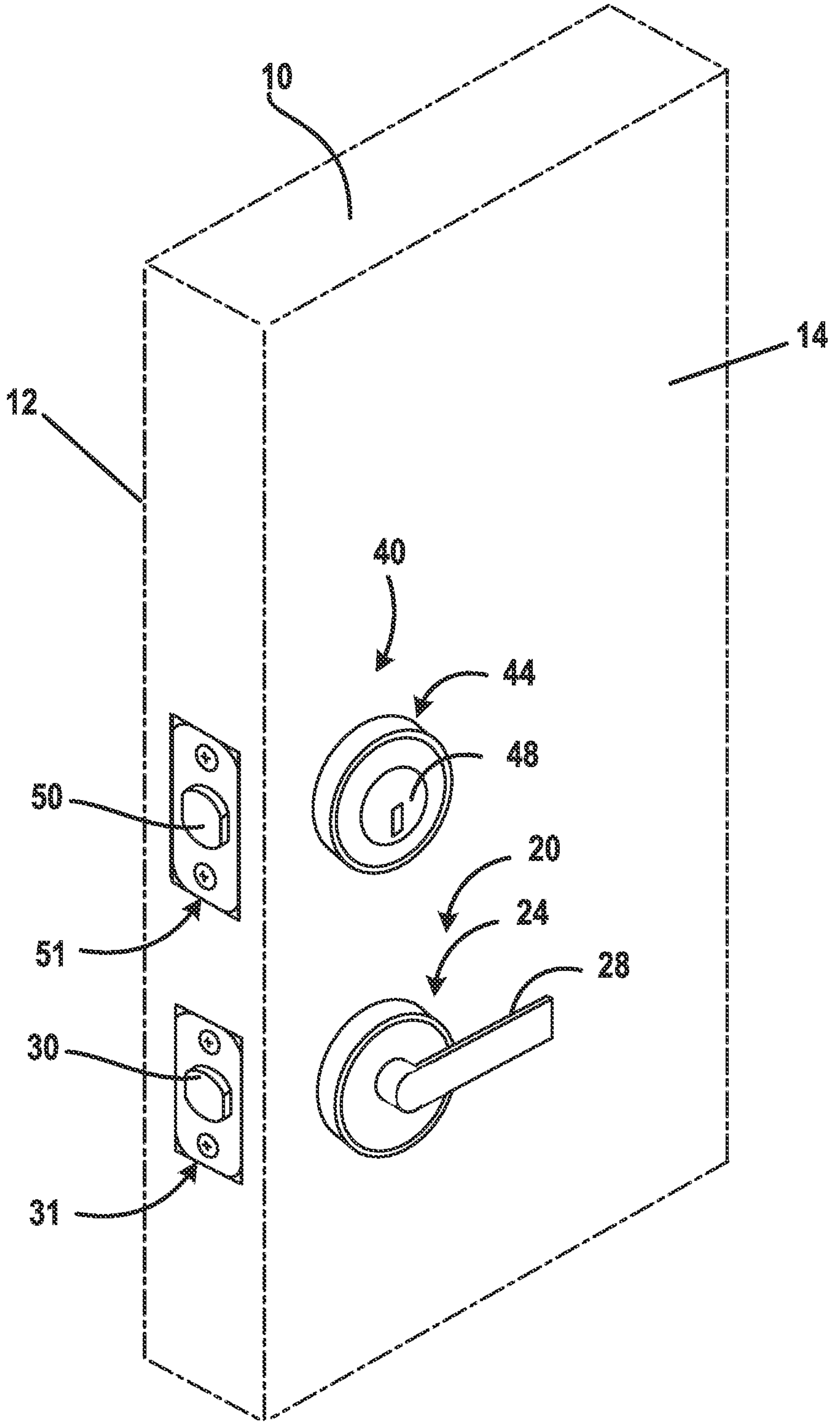
FIG. 2 illustrates a perspective view of an exterior portion of a door having a lockset assembly and a handleset assembly installed thereon.
Figure 3:
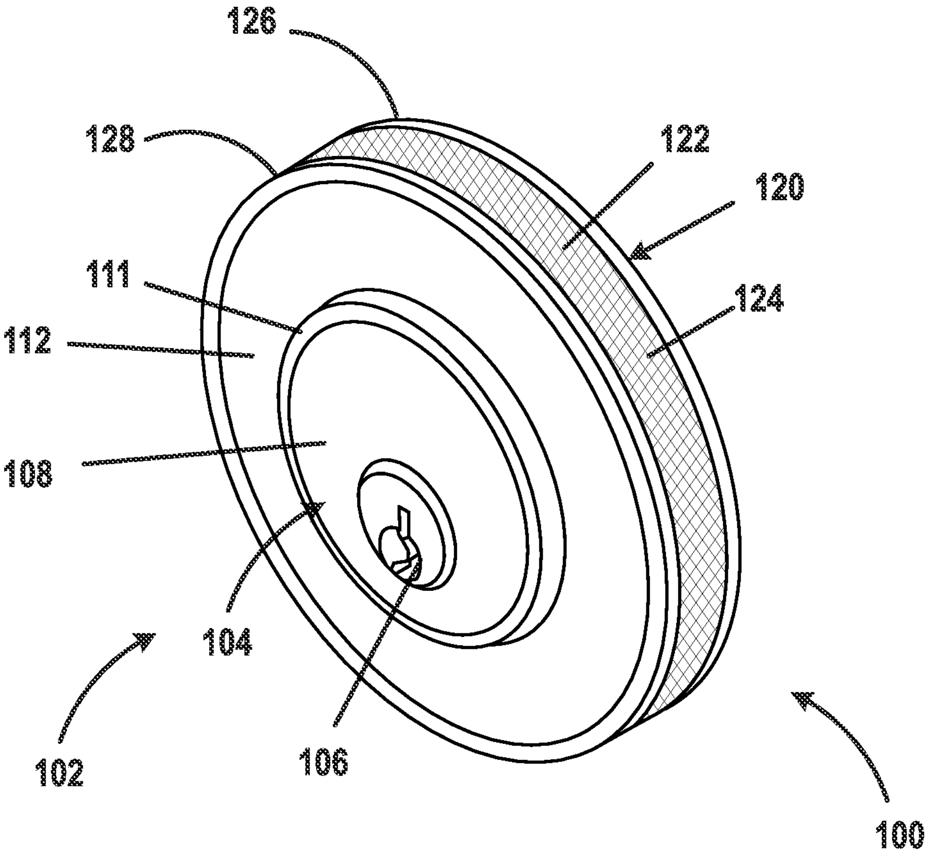
FIG. 3 illustrates a perspective view of a lockset having a trim piece installed in conjunction with an existing trim plate of the lockset, according to an example embodiment.
Figure 4:
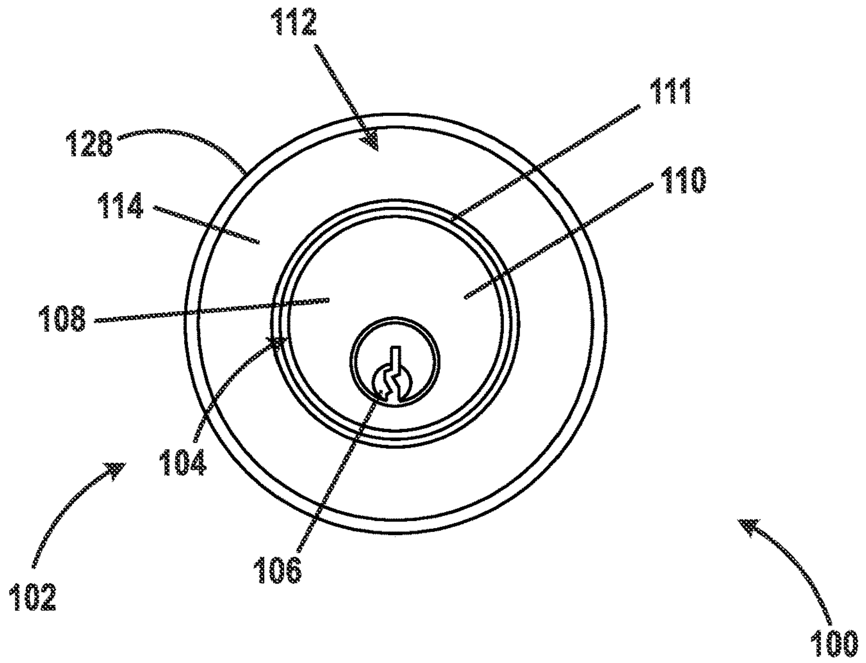
FIG. 4 is a front plan view of the lockset of FIG. 3.
Figure 5:
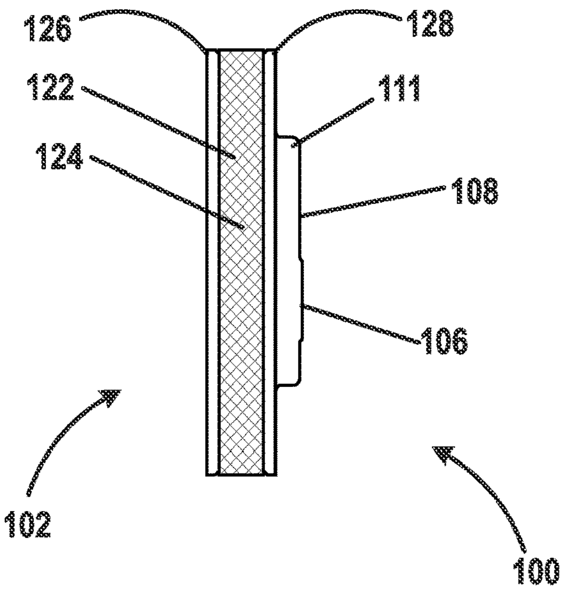
FIG. 5 is a side plan view of the lockset of FIG. 3.

Referring first to FIGS. 1-2, perspective views of an interior portion 12 of a door 10 and an exterior portion 14 of the door, respectively, are shown, on which a handleset assembly 20 and a lockset assembly 40 are mounted. In the example shown, both the handleset assembly 20 and the lockset assembly 40 are mounted at boreholes (examples of which are seen in FIGS. 6-7 and 11-12 as boreholes 60, 80, respectively), extending through the door 10 in a thickness direction, which are then met by crossbore openings that extend from the borehole to an edge 16 of the door.

In the example shown, the handleset assembly 20 includes an interior portion 22 and an exterior portion 24. Each of the interior portion 22 and exterior portion 24 includes a handle 26, 28, respectively. The handles 26, 28 are each rotatable, to rotate a central spindle, connected to a torque blade (not shown). The rotation of the spindle and torque blade operates to selectively extend or retract a latch 30 positioned within the crossbore 31, such that the latch 30 is selectably extendable outward from an edge 16 of the door 10.

Similarly, the lockset assembly 40 includes an interior portion 42 and an exterior portion 44. In this arrangement, the interior portion 42 includes a manual turnpiece 46 and the exterior portion includes a mechanical lock cylinder 48. The manual turnpiece 46 is rotatable by a user to selectively extend or retract a latch 50 (e.g., a deadbolt) positioned within a crossbore 51 that extends to meet a borehole at which the lockset assembly 40 is mounted, and allows extension of the latch from the edge 16 of the door 10.

In the example shown, the door latching assemblies as shown, including both the handleset assembly 20 and the lockset assembly 40, have trim plates, also referred to as decorative plates. Such trim plates cover the borehole and surround a central, rotatable portion of the respective assembly (e.g., a spindle to which the handles 26, 28 attach, or a spindle/torque blade mechanically attached to the manual turnpiece 46 and/or the mechanical lock cylinder 48). Although shown in FIGS. 1-2 as having a generally circular outer footprint, such trim plates may take a variety of shapes and sizes. For simplicity herein, and for discussion of interaction between the trim plates and a trim piece that may be selectively added to surround the trim plate and add further decorative effects, the examples provided below are described in conjunction with a trim plate having a generally circular or cylindrical shape. However, other shapes are possible as well. In any case, the addition of a trim piece may be added in a manner consistent with the present disclosure, thereby changing an overall aesthetic appearance of the door latching assembly.

Furthermore, although both a handleset assembly 20 and a lockset assembly 40 are shown in the example seen in FIGS. 1-2, it is recognized that one of these assemblies may be used to the exclusion of the other, in some examples.

Now referring to FIGS. 3-7, an exterior assembly 102 for a lockset 100 is shown. The exterior assembly 102 has, in this example, a trim piece installable in conjunction with an existing trim plate of the lockset, according to an example embodiment. The lockset 100 represents an example of the lockset 40 seen in FIGS. 1-2.

In the example shown, the exterior assembly 102 includes a mechanical lock assembly 104, including a mechanical lock cylinder 106 and a retention structure 108. The mechanical lock cylinder 106 is retained within the retention structure 108, and is attachable to a torque blade (not shown). When a valid key is inserted into the mechanical lock cylinder 106, that mechanical lock cylinder is rotatable relative to the retention structure 108, to rotate the torque blade and actuate a latch or deadbolt. The retention structure 108 has a front face 110 that is, in the example shown, circular. In alternative examples, the front face 110 may be of different shapes or sizes.

Figure 6:
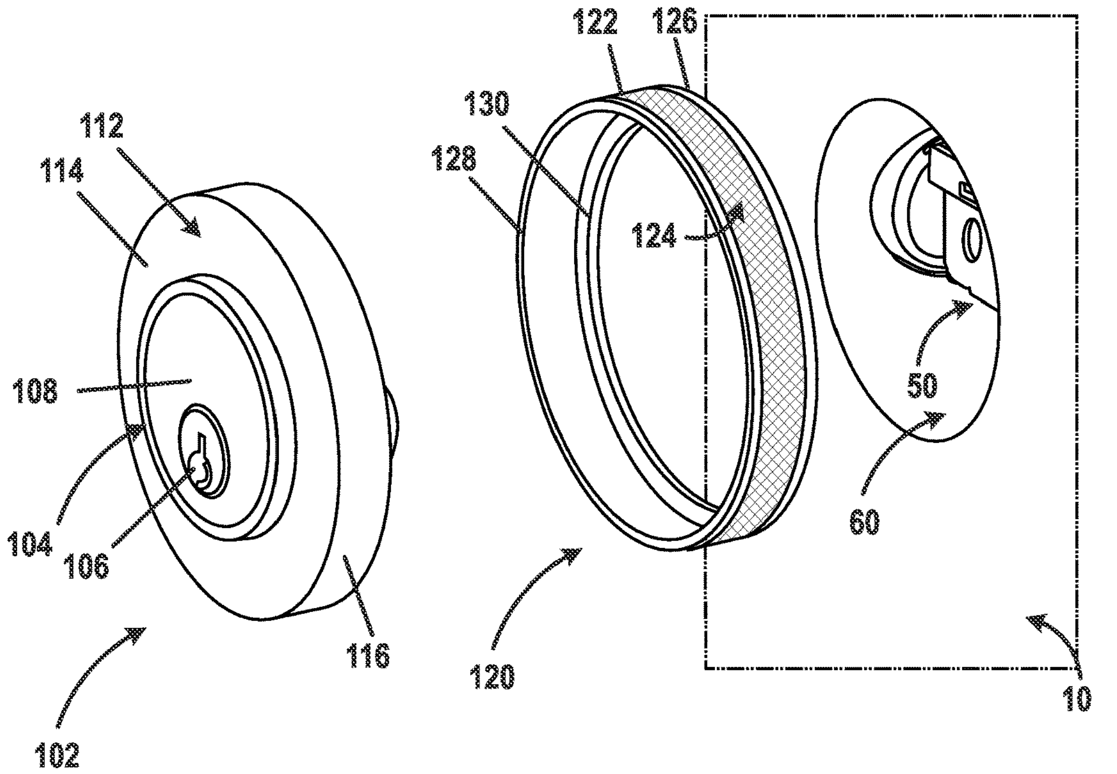
FIG. 6 is an exploded view of an exterior portion of the lockset of FIG. 3, including a trim piece installable in accordance with example embodiments of the present disclosure.
Figure 7:
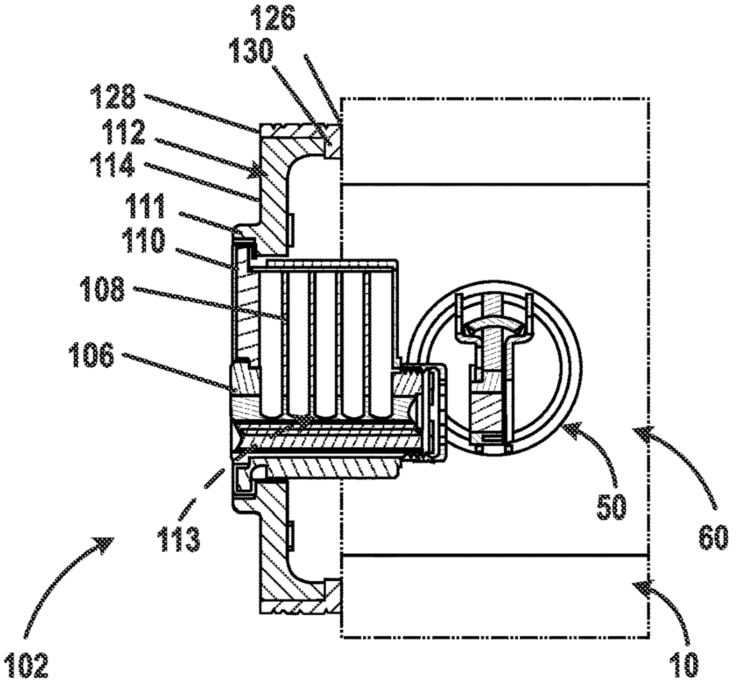
FIG. 7 is a side cross-sectional view of the exterior portion of the lockset of FIG. 3 installed on a door, and including a trim piece installed therewith, in accordance with an example embodiment.
Figure 8:
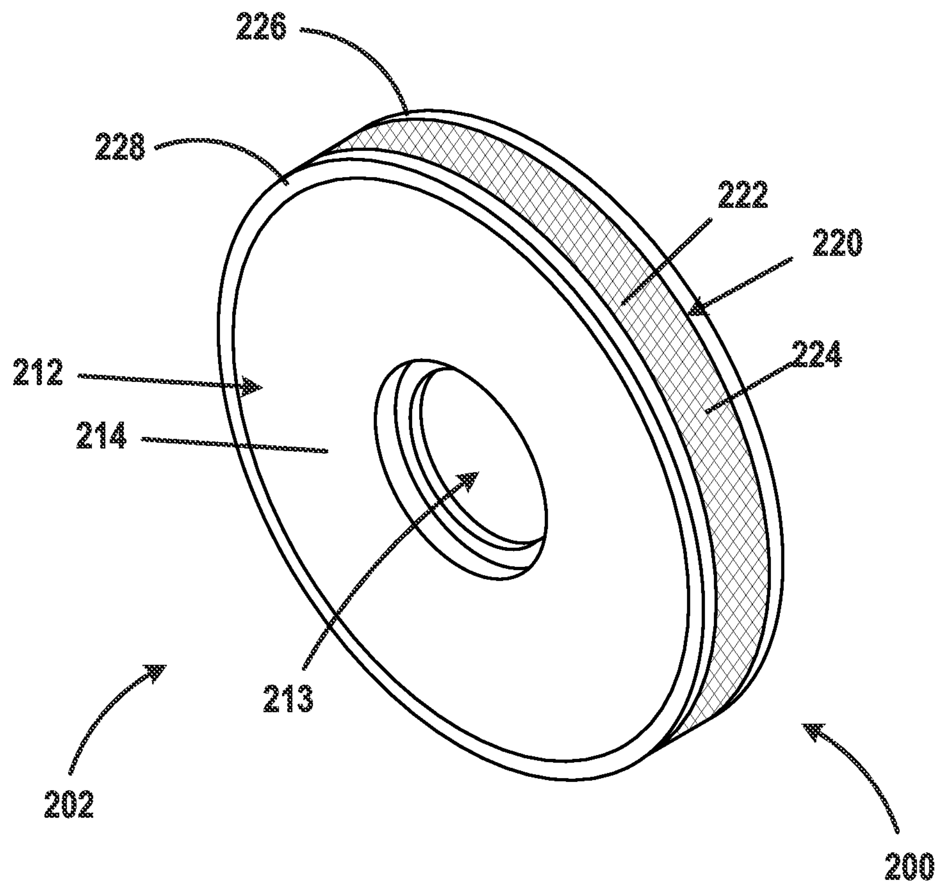
FIG. 8 illustrates a perspective view of a portion of a handleset having a trim piece installed in conjunction with an existing trim plate of the handleset, according to an example embodiment.
Figure 9:
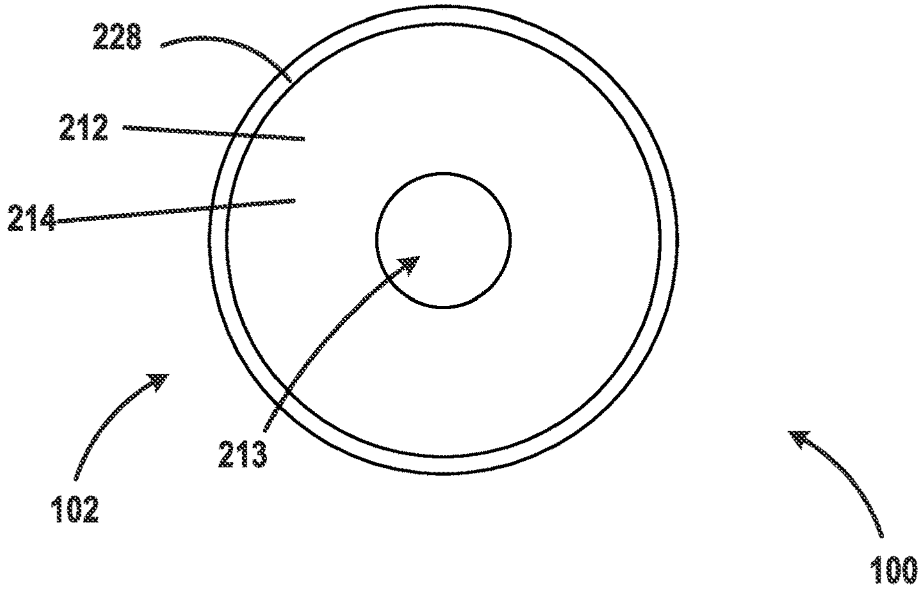
FIG. 9 is a front plan view of the handleset portion of FIG. 8.
Figure 10:
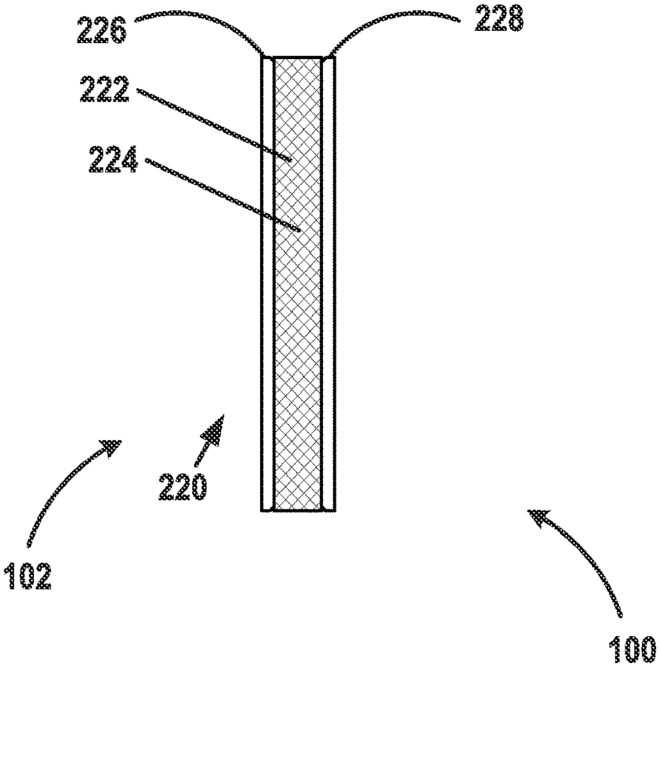
FIG. 10 is a side plan view of the handleset portion of FIG. 8.

A trim plate 112 surrounds the retention structure 108, and is sized to cover a borehole (e.g., borehole 60, as seen in FIGS. 6-7). The trim plate has a front surface 114, and may be a variety of shapes or sizes. In the example shown, the trim plate 112 is generally circular.

In the example shown, the trim plate 112 includes a central aperture 113 within which the mechanical lock assembly 104 is received. Specifically, the trim plate 112 has an aperture 113 having a diameter sufficient to receive the retention structure, but of a smaller diameter than the front face 110 of the retention structure. Optionally, as shown, an axially extending protrusion 111 may surround the front face 110 as well, providing further alignment and retention between the trim plate 112 and the mechanical lock assembly 104.

In the example shown, the trim plate 112 has a radially outward surface 116 that extends generally perpendicularly to the front surface 114. When installed at a door (e.g. at the door 10), the front surface 114 of the trim plate 112 is spaced apart from the surface of the door 10 by a distance defined by width of the surface 116 in an axial direction of the mechanical lock assembly 104. The mechanical lock assembly 104 extends into the borehole 60, in the example shown by a distance greater than the width of the surface 116, for engagement with latch 50 via a torque blade (not shown).

In the example shown, a trim surround 120 may be provided, and may be selectively installed around the outward surface 116 of the trim plate 112. Specifically, the trim surround 120 may have an interior shape complementary to an exterior shape of the trim plate 112.

In the example shown, the trim surround 120 takes the form of a trim ring, having a generally cylindrical shape to match the generally circular shape of the trim plate 112. The trim surround 120 has an outer radial surface 122, including a decorative pattern 124 formed thereon. In alternative embodiments, the trim surround 120 may take another shape complementary to an outer perimeter shape of the trim plate 112, e.g., being square, rectangular, ovoid, or some other shape.

In the example shown, the trim surround 120 is made from a metal material, such as a metal alloy, and the decorative pattern 124 is formed in the material. The material may be selected to match, or be complementary to, the appearance of the trim plate 112 itself. In the example shown, the decorative pattern 124 comprises a knurling pattern; however, other decorative patterns may be used as well.

As seen best in the cross-sectional view of the exterior assembly 112 shown in FIG. 7, the trim surround 120 extends from a rear edge 126 to a front edge 128. To retain the trim surround 120 in place around the trim plate 112 when installed at a door, the trim surround includes a flange 130 that extends radially inward from the rear edge 126. The trim surround 120 has, when in a ring shape, an inner diameter at the front edge 128 that allows installation around the outer edge of the trim plate 112, and the flange has an inner diameter that is inward of that inner diameter, and smaller than an outer diameter of a circular footprint of the trim plate. Accordingly, when installed, the flange 130 is compressed between an outer perimeter portion of the trim plate 112 and the door 10, thereby holding the trim surround 120 in place without requiring the trim surround 120 to be affixed to the trim plate 112 via a fastener or other attachment structure. Additionally, in some examples, the front edge 128 extends from the door such that it is spaced apart from the surface of the door by a distance that is the same as that of the front surface 114 of the trim plate, thereby forming a coextensive front surface. That is, a distance from a surface of the flange 130 on which the trim plate 112 resides to the front edge 128 is a same distance as the depth of the trim plate. In other examples, the front edge 128 may extend a different distance as compared to the front surface 114.

Although in FIGS. 3-7 only the exterior assembly 102 is shown, it is noted that a similar interior assembly may be provided, but may be installed around the trim plate provided in conjunction with a manual turnpiece (e.g., turnpiece 46 as seen in FIGS. 1-2). In such an installation arrangement, the manual turnpiece may or may not be removable from a central spindle arrangement; the trim surround may be installed around the trim plate of an interior assembly similarly to the manner shown in FIGS. 3-5, or may use a separate retention portion, such as a nut, as seen in the example handleset installation described below in conjunction with FIGS. 8-12.

Referring now to FIGS. 8-12, a portion 202 of a handleset 200 is shown. In the example shown, the portion 202 may correspond to either an interior assembly or an exterior assembly. In the example shown (for example, in FIGS. 11-12), a handle 204 is attached to a central spindle 206

(seen in FIG. 12), and is rotatable to actuate a latch (e.g., latch 30) between extended and retracted positions. The portion 202 includes a mounting plate 208 (also referred to, in examples, as a base plate) that mounts at a borehole. The mounting plate 208 has a cylindrical central protrusion 210 having a threaded exterior surface 211 that extends away from the borehole 80. The mounting plate includes a plurality of fastener apertures 209 positioned to receive fasteners that extend through the borehole 80 to fasten the mounting plate 208 to an opposing portion of the handleset 200 on an opposite side of the door 10, for example using bolts (not shown) or other fasteners.

The portion 202 includes a trim plate 212 that has a front surface 214, similar to the trim plate 112. The trim plate 212 has a radially outward surface 216 that extends generally perpendicularly to the front surface 214 (depending on the exact shape and/or curvature of any decorative features on the front surface). When installed at a door, the front surface 214 is spaced apart from the surface of the door by a distance defined by a width of the surface 216 in an axis of rotation of the handle 204.

The trim plate 212 has an aperture 213 through which the handle 204 is attached to central spindle 206, which may extend therethrough. The trim plate is retained over the mounting plate 208 using a retention portion, such as a retention nut 219. The retention nut 219 is threaded over the threaded exterior surface 211 of the cylindrical central protrusion 210, and surrounds the spindle 206 and/or handle 204. While the handle 204 and spindle 206 may rotate to actuate the latch 30, the retention nut 219 remains unrotated once installed. In the example shown (specifically, as seen in FIGS. 11-12), a washer 217 may be positioned over the retention nut 219 after installation, to provide a sliding interface between the retention nut 219 and the handle 204, to reduce resistance when the handle 204 is rotated.

As with the lockset 100 of FIGS. 3-7, a trim surround 220 may be provided, and may be selectively installed around the outward surface 216 of the trim plate 212. Specifically the trim surround 220 may have an interior shape that is complementary to an exterior shape of the trim plate 212.

In the example shown, the trim surround 220 takes the form of a trim ring, having a generally cylindrical shape to match a generally circular shape of the trim plate 212. The trim surround 220 can have an outer radial surface 222, including a decorative pattern 224 formed thereon. As above, the trim surround may be made from a metal material, such as a metal alloy, and the decorative pattern 224 is formed in the material. The decorative pattern 224 may comprise a knurling pattern, or other types of patterns as noted above.

Figure 11:
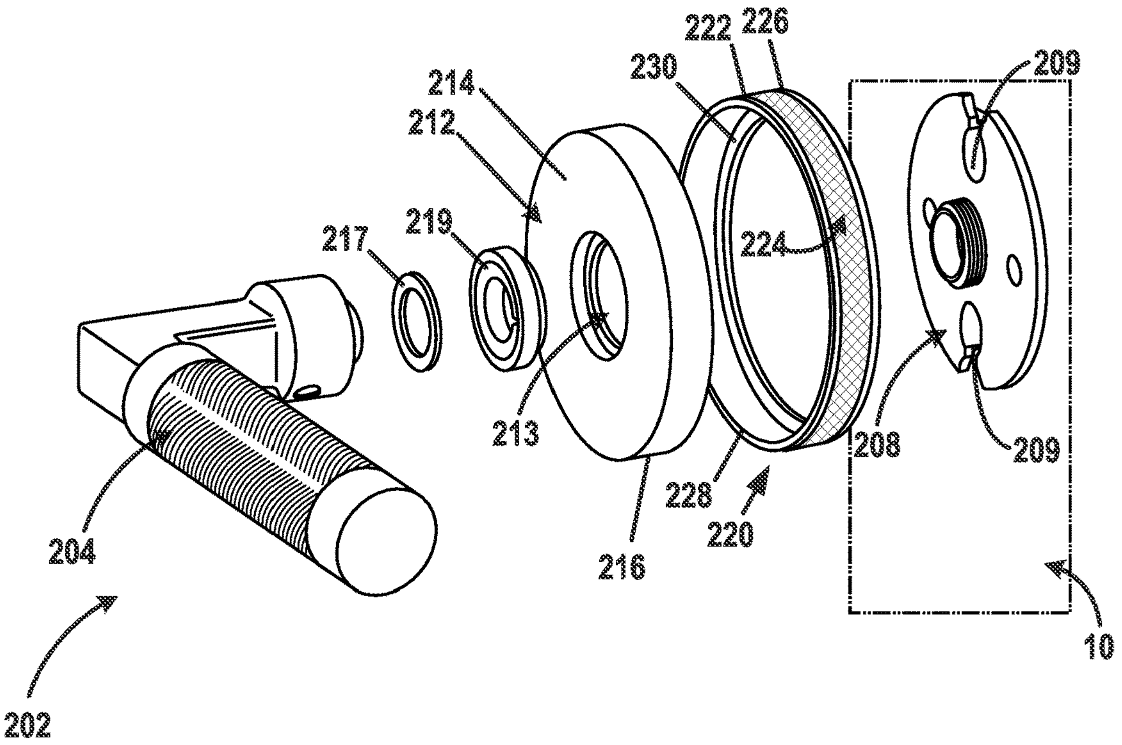
FIG. 11 is an exploded view of an exterior portion of the handleset of FIG. 8, including a trim piece installable in accordance with example embodiments of the present disclosure.
Figure 12:
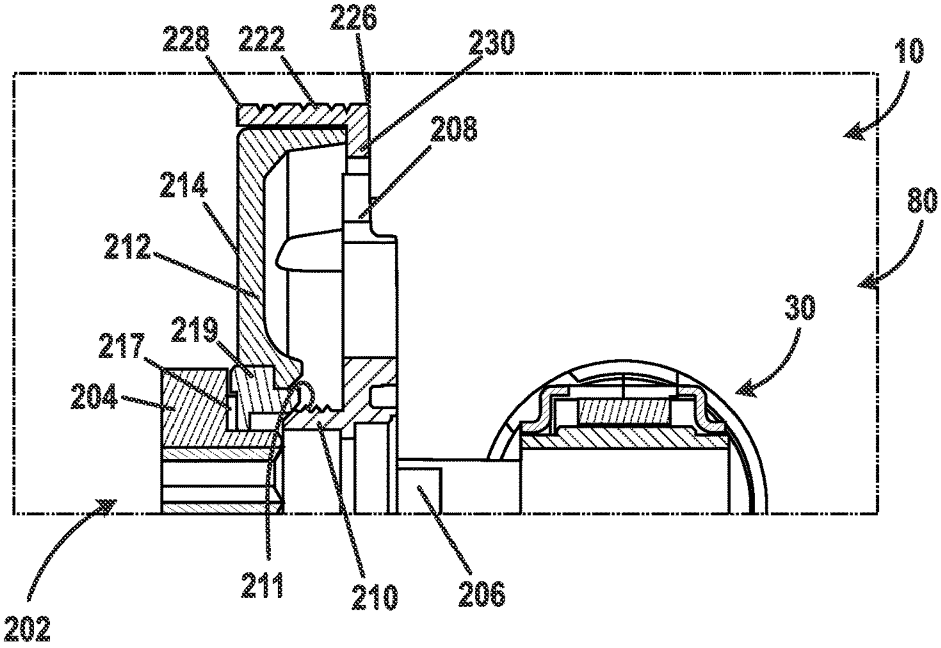
FIG. 12 is a side cross-sectional view of the exterior portion of the handleset of FIG. 8 installed on a door, and including a trim piece installed therewith, in accordance with an example embodiment.

In the example shown, specifically as seen in FIGS. 11-12, the trim surround extends from a rear edge 226 to a front edge 228. To retain the trim surround 220 in place around the trim plate 212 when installed at a door, the trim surround includes a flange 230 that extends radially inward from the rear edge 226. The trim surround 220 has, when in a ring shape, an inner diameter at the front edge 228 that allows installation around the outer edge of the trim plate 212, and the flange 230 has an inner diameter that is inward of that inner diameter, and smaller than an outer diameter of a circular footprint of the trim plate. Accordingly, when installed, the flange 230 is placed between an outer perimeter portion of the trim plate 212 and the door 10, thereby holding the trim surround 220 in place without requiring it to be affixed to the trim plate 202 via a fastener or other attachment structure. To avoid interference with the mounting plate 208, the flange 230 extends inwardly to a location that remains radially outward and spaced apart from an outermost edge of the mounting plate. In other examples, the flange 230 may extend further inwardly; preferably, no interference between the flange 230 and a mounting plate prevents flush installation of the trim surround 220 and trim plate 212 against the door 10 when installed. Still further, while a single flange 130, 230 is illustrated in FIGS. 3-12, it is noted that the flange may be segmented such that two or more inwardly oriented segments of a flange are provided.

In some examples, the front edge 228 extends from the door such that it is spaced apart from the surface of the door by a distance that is the same as that of the front surface 214 of the trim plate, thereby forming a coextensive front surface. That is, a distance from a surface of the flange 230 on which the trim plate 212 resides to the front edge 228 is a same distance as the depth of the trim plate. In other examples, the front edge 228 may extend a different distance as compared to the front surface 214. The spindle 206 extends into the borehole 80 for engagement with latch 30 via a torque blade (not shown).

Although, in the examples shown, a handle 230 is shown on one side of a handleset, other types of grippable features may be provided. For example, knobs and the like may be provided on one or both sides of a handleset 200, in a manner consistent with the present disclosure. Furthermore, in some instances, only one side (e.g., either an interior assembly or an exterior assembly) of a handleset or lockset might be configured to receive such a trim surround, while in other instances, both sides may be configured to receive the same or different types of trim surround pieces.

Referring to FIGS. 13-17, additional example embodiments of a trim surround are provided. The additional example embodiments illustrate alternative methods of attachment of such a trim surround at a trim piece of a door latching assembly.

Figure 13:
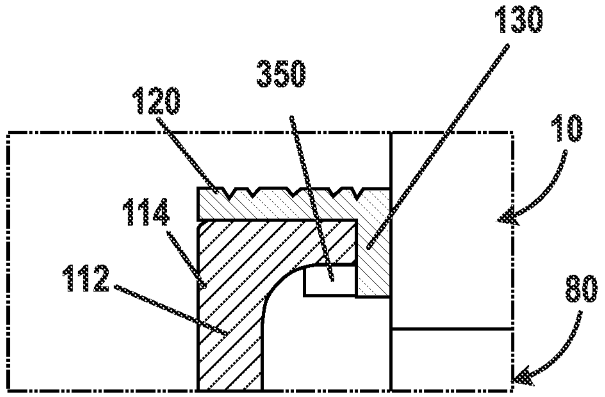
FIG. 13 is a side cross-sectional view of a portion of an actuating assembly in accordance with a further example embodiment.

In the example shown in FIG. 13, a modification of the arrangement of FIGS. 3-7 is provided. In FIG. 13, a magnet 350 may be mounted to the trim plate 112, for example at a rear edge of the trim plate. The magnet 350 may be exposed to contact a portion of the flange 130 and/or the trim surround 120 itself, to assist in maintaining positional relationship between the trim plate 112 and trim surround. In some examples, inclusion of the magnet 350 may reduce the need to include the flange 130 at all.

Figure 14:
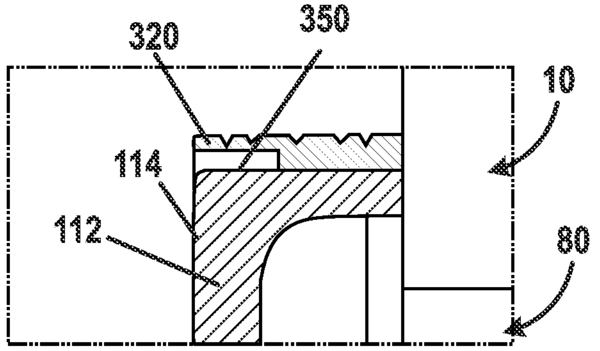
FIG. 14 is a side cross-sectional view of a portion of an actuating assembly in accordance with a still further possible embodiment.

FIG. 14 illustrates a cross-sectional view of an alternative arrangement of that seen in FIGS. 3-7, in which a trim surround 320 is instead provided. The trim surround 320 includes, as a retaining mechanism, a magnet 350 on an interior-facing surface. The magnet 350 may be useable to attach the trim surround 320 to the trim plate 112. In this example, the trim surround 320 does not need to include a flange such as flange 130 of trim surround 120. When such a flange is not included, the trim surround 320 may be added or removed without separately removing the trim plate from its location as installed at door 10.

Notably, both the configurations seen in FIGS. 13-14 may equivalently be used to modify the trim plate 212 and/or trim surround 220 seen in FIGS. 8-12.

Figure 15:
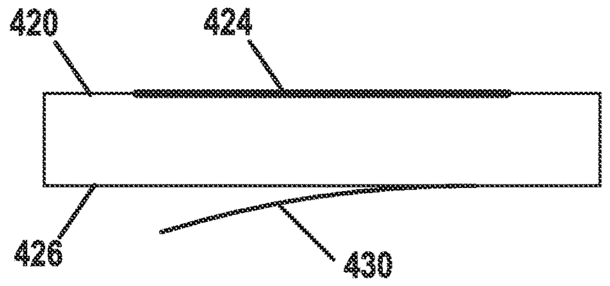
FIG. 15 is a schematic side cross-sectional view of a portion of a further embodiment of a trim surround useable in accordance with the present disclosure.
Figure 16:
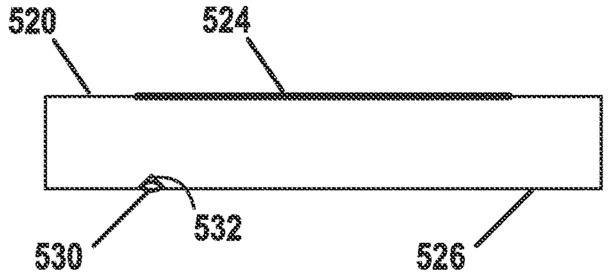
FIG. 16 is a schematic side cross-sectional view of a portion of a yet further embodiment of a trim surround useable in accordance with the present disclosure.
Figure 17:
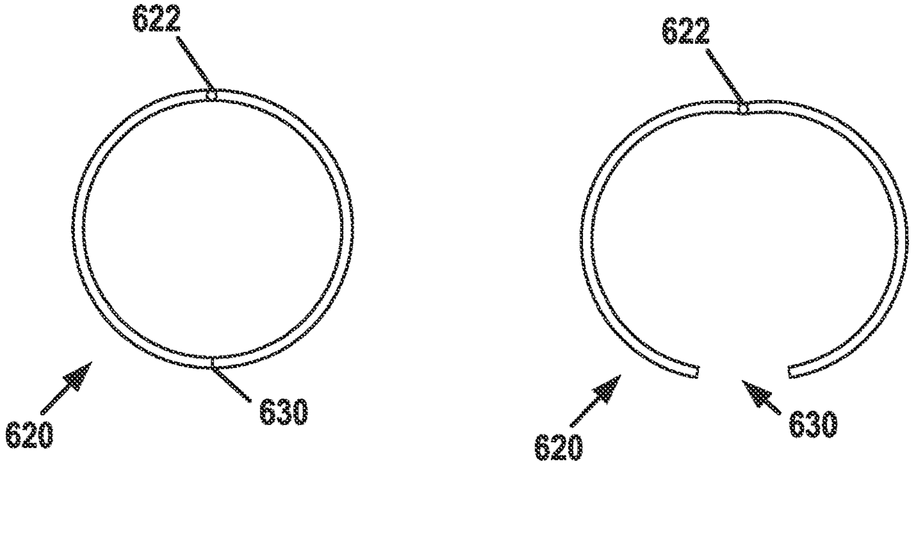
FIG. 17 is a schematic side cross-sectional view of a portion of a still further embodiment of a trim surround useable in accordance with the present disclosure.

FIGS. 15-17 show still further example configurations of a trim surround that provide alternative attachment mechanisms between such a trim surround and a trim plate. FIG. 15 illustrates a side cross-sectional view of a trim surround 420 having a decorative outer surface 424, and an inner surface having a deformable leaf 430 installed thereon. In this example, the trim surround 420 may be installed over a trim plate (e.g., either of trim plates 112, 212) without removal of the trim plate from the door, by sliding the trim surround 420 over the outer perimeter of the trim plate, typically, from left to right in the direction represented in the schematic illustration. When installed, the deformable leaf 430 (which may be a single leaf, or may be implemented as multiple deformable leaves positioned along an interior circumference of the trim surround 420), will be deformed outwardly toward the inner surface 426 of the trim surround 420. The deformed leaf 430 will maintain an inward pressure on the trim plate, thereby holding the trim surround in place.

FIG. 16 illustrates a side cross-sectional view of a trim surround 520 including a decorative outer surface 524 and an inner surface 526 having a groove 532 formed thereon. An o-ring 530 or other gasket may be positioned within the groove 532, and may, when the trim surround 520 is installed over a trim plate (e.g., trim plates 112, 212 described above) apply inward pressure against an outer peripheral surface of the trim plate, thereby maintaining the trim surround 520 in place.

FIG. 17 illustrates trim surround 620 that has a pivotable clamping two-piece construction. In particular, the trim surround 620 includes a hinge 622 and clasp 630. In examples, the trim surround 620 may be shaped to have one or more interior retaining mechanisms, such as barbs, magnets, or the like. In some instances, the trim surround 620 may include a flange as seen in the embodiments of FIGS. 3-12.

As with the variants seen in FIGS. 13-14, the trim surround attachment mechanisms may be used in conjunction with the various trim plates contemplated herein. Furthermore, while shown in some examples as being circular or cylindrical, it is noted that other shapes or configurations (e.g., rectangular, oval or ovoid, etc.) could be possible as well. Still further, other attachment mechanisms could be used to maintain the relative positions of a trim surround and a trim plate once installed, in a manner consistent with the present disclosure. For example, a push-nut or other retaining mechanism may be used in conjunction with the trim surround. Different types of retaining mechanisms may be adapted for use, depending on the relative weights, shapes, and materials of the trim plate and trim surround.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A door latching assembly comprising:

an actuating mechanism including a handle, the actuating mechanism including a retention portion and an axial portion, the axial portion extending into a borehole of a door when installed at the door, and including a rotatable portion;

a trim plate surrounding an aperture sized to allow the axial portion of the actuating mechanism to extend therethrough, the trim plate being sized to cover the borehole of the door on which the door latching assembly is installed, the trim plate having an exposed front face and positioned to interface with the retention portion of the actuating mechanism; and a trim surround having a shape complementary to and installable around an outer perimeter of the trim plate, the trim surround having a front edge and a rear edge, the trim surround including a retaining mechanism maintaining the trim surround around the trim plate, wherein when the trim plate is mounted to the door, the retaining mechanism is positioned between the trim plate and the door.

2. The door latching assembly of claim 1, wherein the retaining mechanism comprises a flange extending radially inwardly from the rear edge of the trim surround to a position inward toward the rotatable portion of the actuating mechanism on a side of the trim plate opposite the exposed front face.

3. The door latching assembly of claim 2, wherein the flange retains the trim surround to the trim plate when installed at the borehole without requiring fasteners between the trim surround and the trim plate.

4. The door latching assembly of claim 2, wherein, when installed at the door, at least a portion of the trim plate remains exposed when the trim surround is installed thereon.

5. The door latching assembly of claim 2, further comprising a base plate installed at the borehole, the base plate including a threaded cylindrical protrusion extending through the trim plate.

6. The door latching assembly of claim 5, wherein the retention portion comprises a retention nut configured to engage the threaded cylindrical protrusion and engage an inner flange of the trim plate, thereby retaining the trim plate against the base plate.

7. The door latching assembly of claim 6, wherein the flange of the trim surround is spaced apart from the base plate when installed around the trim plate.

8. The door latching assembly of claim 1, wherein the trim surround includes an outer decorative surface.

9. The door latching assembly of claim 1, wherein the trim surround comprises a trim ring having a metallic cylindrical portion having a radially outward decorative surface.

10. A door latching assembly installable on a door, the door latching assembly comprising:

an actuator including a retention portion and an axial portion that is rotatable relative to the retention portion;

a trim plate surrounding an aperture sized to allow the axial portion of the actuator to extend therethrough, the trim plate having an exposed front face and an inner flange positioned to interface with the retention portion of the actuator;

a base plate including a threaded cylindrical protrusion extending through the trim plate; and a trim surround having a shape complementary to and installable around an outer perimeter of the trim plate, the trim surround having a front edge and an opposite rear edge, the rear edge being nearer to the door than the front edge, the trim surround including a flange extending radially inwardly from the rear edge to a position inward from an outermost edge of the trim plate on a side of the trim plate opposite the exposed front face, the flange being positioned between the trim plate and the door when the door latching assembly is installed on the door.

11. The door latching assembly of claim 10, wherein an outer perimeter of the trim plate is circular, and the trim surround is cylindrical and has an inner diameter at the front edge corresponding to an outer diameter of the trim plate.

12. The door latching assembly of claim 11, wherein the flange of the trim surround extends inwardly of the inner diameter at the rear edge to a position radially outward of an outermost edge of the base plate.

13. The door latching assembly of claim 10, wherein the trim plate has a radially outward decorative surface.

14. The door latching assembly of claim 13, wherein the radially outward decorative surface includes a knurling pattern.

15. The door latching assembly of claim 10, wherein the actuator comprises a handle.

16. The door latching assembly of claim 10, wherein the retention portion comprises a retention nut configured to engage the threaded cylindrical protrusion and engage the inner flange of the trim plate, thereby retaining the trim plate against the base plate.

17. A trim ring installable around a circular trim plate of a door latching assembly on a door, the trim ring having a predetermined outer diameter and a front face, the trim ring comprising:

a cylindrical body having a front edge, an opposite rear edge, and a radially outward surface having a decorative pattern formed thereon, the rear edge being nearer to the door than the front edge; and a flange extending inwardly from the rear edge on a side opposite the front face of the circular trim plate, the flange being positioned between the trim plate and the door when the trim ring is installed around the trim plate and the trim plate is installed on the door.

18. The trim ring of claim 17, wherein the decorative pattern comprises a knurling pattern.

19. The trim ring of claim 17, wherein the cylindrical body is constructed from a metal material.

* * * * *